US012644008B2

(12) United States Patent
Mestach et al.

(10) Patent No.: US 12,644,008 B2
(45) Date of Patent: Jun. 2, 2026

(54) WATERBORNE COATING COMPOSITION

(71) Applicant: Allnex Netherlands B.V., Bergen Op Zoom (NL)

(72) Inventors: Dirk Mestach, Nijlen (BE); Silfredo Bohorquez, Rotterdam (NL); Karin Van De Sanden-Van Aert, Huijbergen (NL); Ankie Van Gorkum, Oosteind (NL)

(73) Assignee: ALLNEX NETHERLANDS BV, Bergen Op Zoom (NL)

( * ) Notice: Subject to any disclaimer, the term of this patent is extended or adjusted under 35 U.S.C. 154(b) by 624 days.

(21) Appl. No.: 18/020,160

(22) PCT Filed: Aug. 5, 2021

(86) PCT No.: PCT/EP2021/071839
§ 371 (c)(1),
(2) Date: Feb. 7, 2023

(87) PCT Pub. No.: WO2022/033945
PCT Pub. Date: Feb. 17, 2022

(65) Prior Publication Data
US 2023/0287235 A1 Sep. 14, 2023

(30) Foreign Application Priority Data

Aug. 11, 2020 (EP) .................................... 20190434

(51) Int. Cl.

| | |
|---|---|
| *C09D 125/14* | (2006.01) |
| *C08F 2/10* | (2006.01) |
| *C08F 12/08* | (2006.01) |
| *C08F 20/06* | (2006.01) |
| *C08F 212/00* | (2006.01) |
| *C09D 7/20* | (2018.01) |
| *C09D 133/08* | (2006.01) |

(52) U.S. Cl.
CPC .............. *C09D 125/14* (2013.01); *C08F 2/10* (2013.01); *C08F 12/08* (2013.01); *C08F 20/06* (2013.01); *C08F 212/00* (2013.01); *C09D 7/20* (2018.01); *C09D 133/08* (2013.01)

(58) Field of Classification Search
CPC ...... C09D 125/14; C09D 7/20; C09D 133/08; C08F 2/10; C08F 12/08; C08F 20/06; C08F 212/00
See application file for complete search history.

(56) References Cited

U.S. PATENT DOCUMENTS

| | | |
|---|---|---|
| 5,962,571 A | 10/1999 | Overbeek et al. |
| 6,444,749 B2 | 9/2002 | Mestach |
| 6,617,389 B1 | 9/2003 | Delaunoit et al. |
| 2008/0058473 A1 | 3/2008 | Freidzon et al. |
| 2011/0144265 A1 | 6/2011 | Durant |
| 2014/0065435 A1 | 3/2014 | Overbeek |
| 2014/0127153 A1 | 5/2014 | Schellekens et al. |
| 2017/0275408 A1 | 9/2017 | Yang et al. |
| 2018/0086936 A1 | 3/2018 | Steiner et al. |
| 2019/0100613 A1 | 4/2019 | Balk et al. |
| 2019/0144702 A1 | 5/2019 | Bohorquez et al. |
| 2019/0389993 A1 | 12/2019 | Junk et al. |
| 2020/0024440 A1 | 1/2020 | DeRocher et al. |
| 2020/0157375 A1 | 5/2020 | Akkerman et al. |
| 2021/0147594 A1 | 5/2021 | Kastelijn et al. |
| 2022/0145116 A1* | 5/2022 | Mestach .............. C09D 133/06 |

FOREIGN PATENT DOCUMENTS

| | | |
|---|---|---|
| AU | 2011298374 | 3/2012 |
| CA | 2 189 236 | 7/2000 |
| CN | 103201303 | 7/2013 |
| CN | 106939060 | 7/2017 |
| CN | 109071733 | 12/2018 |
| EP | 0 758 362 | 2/1997 |
| EP | 0 758 364 | 4/2006 |
| EP | 3 604 364 | 2/2020 |
| FR | 2 940 801 | 7/2010 |
| FR | 2 943 347 | 9/2010 |
| TW | 201840694 | 11/2018 |
| WO | 2008/122576 | 10/2008 |
| WO | 2012/084973 | 6/2012 |
| WO | 2012/084974 | 6/2012 |
| WO | 2012/130817 | 10/2012 |
| WO | 2013/113930 | 8/2013 |
| WO | 2019/011693 | 1/2019 |

OTHER PUBLICATIONS

International Search Report (ISR) issued Oct. 20, 2021 in International (PCT) Application No. PCT/EP2021/071839.

* cited by examiner

*Primary Examiner* — Jiangtian Xu

(74) *Attorney, Agent, or Firm* — Wenderoth, Lind & Ponack, L.L.P.

(57) ABSTRACT

The present invention relates to the field of an aqueous vinyl polymer dispersion PD comprising a hydrophilic vinyl oligomer, a hydrophobic vinyl oligomer and a vinyl polymer obtained by the emulsion polymerization of ethylenically unsaturated monomers from petrochemical or renewable origin. The present invention also relates to a process for making the aqueous vinyl polymer dispersion; to a coating composition comprising said aqueous vinyl polymer dispersion and the method making thereof; to a paint formulation comprising said aqueous vinyl polymer dispersion; and to an article coated with the coating composition or the paint formulation. The coating compositions are especially suitable for decorative and industrial wood applications.

26 Claims, No Drawings

WATERBORNE COATING COMPOSITION

TECHNICAL FIELD

The present invention relates to an aqueous vinyl polymer dispersion PD comprising a hydrophilic vinyl oligomer, a hydrophobic vinyl oligomer and a vinyl polymer obtained by the emulsion polymerization of ethylenically unsaturated monomers from petrochemical or renewable origin. The present invention also relates to a process for making the aqueous vinyl polymer dispersion; to a coating composition comprising said aqueous vinyl polymer dispersion and the method making thereof; to a paint formulation comprising said aqueous vinyl polymer dispersion; and to an article coated with the coating composition or the paint formulation.

DESCRIPTION OF THE RELATED ART

The minimal film-formation temperature (MFFT) of a waterborne coating is normally closely related to the glass transition temperature (Tg) of the dispersed polymer. Using control over the morphology of the dispersed particles, the gap between MFFT and Tg can be broadened. Combining a low MFFT with a high Tg is a known way in the art to combine conflicting properties such as low volatile organic compound content (VOC) with good mechanical, chemical and water resistance properties. However, a particular problem with waterborne coating compositions in the art is still the short period of time in which a freshly applied layer of coating can be re-manipulated without leaving visible defects in the cured coating like brush marks, roller marks, spray dust (commonly known as 'overspray') or visible lines at joints between adjacent coating layers.

A layer of a coating composition freshly applied to a substrate is said to be "open" when it is still in a state where it can be manipulated during the drying without leaving substantial visible defects in the dried coating. The open time is the period of time between the point of first application of a coating layer up to the point where corrections can no longer be made in the wet paint film without leaving visible defects.

It is a longstanding desire to improve the open time of waterborne paints based on aqueous film-forming coating compositions.

EP 0 758 364 B2 teaches a waterborne coating composition that comprises a polymer dispersion synthesized by means of emulsion polymerization of ethylenically unsaturated monomer in the presence of an aqueous solution of an acid-functional oligomer built from olefinically unsaturated monomers that has a favorable relation between the MFFT and Koenig hardness. This patent, however, is silent about the application properties of the formulated coatings such as open time or wet edge.

WO2012084973 describes an aqueous polymer coating composition comprising a vinyl polymer A having a weight average molecular weight Mw in the range of from 1,000 to 150,000 g/mol and an acid value >5 mg KOH/g; and a vinyl polymer B having a weight average molecular weight Mw of at least 80,000 g/mole and an acid value <35 mg KOH/g; wherein the weight percentage of olefinically unsaturated monomers used to form polymer A and polymer B are in the ratio of 5:70 to 95:30 and add up to 100% and where at least 20 wt % of at least one of polymer A and or polymer B is derived from at least one bio-renewable olefinically unsaturated monomer. Basically these polymers perform exactly like the ones described in EP 0 758 364 B2 the difference being the use of monomers derived from biomass. Again this patent is silent about the application properties of aqueous coating compositions comprising them.

FR 2 940 801 describes a process for the production of methyl methacrylate by the oxidation of methacrolein into methacrylic acid and esterification of the latter with methanol that is characterized by the fact that the reactants are wholly or partially derived from biomass.

US 2011/0144265 relates to the use of alkyl esters of itaconic acid that are polymerized in aqueous medium in the presence of seed particles. The polymers that are produced may be used as binders in adhesives, paints and paper formulations.

FR 2 943 347 relates to a polymer with a core-shell structure comprising an elastomeric core polymer, having a glass transition temperature below 25° C., and a shell polymer having a glass transition temperature above 25° C., characterized in that at least one of said polymers comprises an acrylic acid ester or a methacrylic acid ester comprising organic carbon originating from biomass determined according to ASTM D6866.

A need still exists for aqueous coating compositions having a low VOC content and providing good (or even improved) mechanical, chemical and water resistance properties combined with improved (longer, extended) open time of the resulting waterborne coatings (or paints) based thereon (compared to compositions described in the art). Furthermore, there is a continuing demand for more sustainable waterborne coating compositions that have good application properties whilst requiring less co-solvent. Replacing monomers that are based on fossil feedstock by monomers that are based on renewable feedstock, also contributes to the sustainable character of the coatings made thereof.

SUMMARY OF INVENTION

According to an aspect of the present invention, there is therefore provided an aqueous vinyl polymer dispersion PD, as set out in the appended claims.

According to another aspect of the invention, there is provided a process for making the aqueous vinyl polymer dispersion PD, as set out in the appended claims.

According to other aspects of the invention, a coating composition comprising said aqueous vinyl polymer dispersion and the method making thereof, a paint formulation (or paint composition) comprising the coating composition, an article coated with the coating composition, and use of the aqueous vinyl polymer dispersion are provided as well, as set out in the appended claims.

Advantageous aspects of the present invention are set out in the (dependent) claims and are further discussed in the description below.

DETAILED DESCRIPTION OF THE INVENTION

This invention relates to an aqueous vinyl polymer dispersion for use in the coating compositions according to the invention. This aqueous vinyl polymer dispersion PD comprises:

1) an aqueous dispersion or an aqueous solution of a vinyl oligomer OL1 obtainable by free radical emulsion copolymerization of a monomer mixture comprising:
    a) from 5 to 20 wt % of acid functional ethylenically unsaturated monomers M1 or precursors thereof;

b) from 5 to 90 wt % of non-ionic ethylenically unsaturated monomers M2 other than M1;

c) from 0.5 to 10 wt % of ethylenically unsaturated monomers M3 with a functional group for cross-linking after film-formation;

d) from 0.5 to 10 wt % of at least one chain transfer agent CTA;

where the sum of the weight percentages of monomers M1, M2, M3 and chain transfer agent CTA equals to 100 wt %;

2) an aqueous dispersion of vinyl oligomer OL2 obtainable by free radical emulsion copolymerization of:

a) from 0 to 5 wt % acid functional ethylenically unsaturated monomers M1' or precursors thereof;

b) from 5 to 99.5 wt % of non-ionic ethylenically unsaturated monomers M2' other than M1';

c) from 0 to 5 wt % of ethylenically unsaturated monomers M3' with a functional group for cross-linking after film-formation;

d) from 0 to 5 wt % of adhesion promoting ethylenically unsaturated monomers M4';

e) from 0 to 3 wt %, preferably from 0.1 to 3 wt %, of a polyethylenically unsaturated monomer M5';

f) from 0.5 to 10 wt % of at least one chain transfer agent CTA';

where the sum of the weight percentages of monomers M1', M2', M3', M4', M5' and chain transfer agent CTA' equals to 100 wt %; and 3) a vinyl polymer P under the form of an aqueous dispersion (or an aqueous dispersion of a vinyl polymer P) comprising:

a) from 0 to 5 wt % of acid functional ethylenically unsaturated monomers M1" or precursors thereof;

b) from 5 to 99.5 wt % of non-ionic ethylenically unsaturated monomers M2" other than M1";

c) from 0 to 5 wt % of ethylenically unsaturated monomers M3" with a functional group for cross-linking after film-formation;

d) from 0 to 5 wt % of adhesion promoting ethylenically unsaturated monomers M4";

e) from 0 to 3 wt %, preferably from 0.1 to 3 wt %, of a polyethylenically unsaturated monomer M5";

f) from 0 to 1 wt % of at least one chain transfer agent CTA", preferably 0 wt % of CTA";

where the sum of the weight percentages of monomers M1", M2", M3", M4", M5" and chain transfer agent CTA" equals to 100 wt %.

Preferably, the aqueous vinyl polymer dispersion PD comprises:

1) an aqueous dispersion or an aqueous solution of a vinyl oligomer OL1 obtainable by free radical emulsion copolymerization of a monomer mixture comprising:

a) from 5 to 20 wt % of acid functional ethylenically unsaturated monomers M1 or precursors thereof;

b) from 5 to 90 wt % of non-ionic ethylenically unsaturated monomers M2 other than M1;

c) from 0.5 to 10 wt % of ethylenically unsaturated monomers M3 with a functional group for cross-linking after film-formation;

d) from 0.5 to 10 wt % of at least one chain transfer agent CTA;

where the sum of the weight percentages of monomers M1, M2, M3 and chain transfer agent CTA equals to 100 wt %;

2) an aqueous dispersion of vinyl oligomer OL2 obtainable by free radical emulsion copolymerization of:

a) from 0 to 5 wt % acid functional ethylenically unsaturated monomers M1' or precursors thereof;

b) from 5 to 99.5 wt % of non-ionic ethylenically unsaturated monomers M2' other than M1';

c) from 0 to 5 wt % of ethylenically unsaturated monomers M3' with a functional group for cross-linking after film-formation;

d) from 0 to 5 wt % of adhesion promoting ethylenically unsaturated monomers M4';

e) from 0.1 to 3 wt % of a polyethylenically unsaturated monomer M5';

f) from 0.5 to 10 wt % of at least one chain transfer agent CTA';

where the sum of the weight percentages of monomers M1', M2', M3', M4', M5' and chain transfer agent CTA' equals to 100 wt %; and 3) a vinyl polymer P under the form of an aqueous dispersion (or an aqueous dispersion of a vinyl polymer P) comprising:

a) from 0 to 5 wt % of acid functional ethylenically unsaturated monomers M1" or precursors thereof;

b) from 5 to 99.5 wt % of non-ionic ethylenically unsaturated monomers M2" other than M1";

c) from 0 to 5 wt % of ethylenically unsaturated monomers M3" with a functional group for cross-linking after film-formation;

d) from 0 to 5 wt % of adhesion promoting ethylenically unsaturated monomers M4";

e) from 0.1 to 3 wt % of a polyethylenically unsaturated monomer M5";

f) from 0 to 1 wt % of at least one chain transfer agent CTA", preferably 0 wt % of CTA";

where the sum of the weight percentages of monomers M1", M2", M3", M4", M5" and chain transfer agent CTA" equals to 100 wt %.

By "ethylenically unsaturated monomer" is meant in the present invention a monomer having at least one carbon-carbon double bond which can undergo free-radical polymerization.

The prefix "(meth)acryl" when used to name compounds of the present invention encompasses both "acryl" and "methacryl" and refers to compounds comprising at least one $CH_2=CHCOO-$ group or $CH_2=C(CH_3)COO-$ group, as well as mixtures thereof and mixtures of such compounds.

By "vinyl oligomer" is meant a low molecular weight polymer that is obtained by means of the radical polymerization of ethylenically unsaturated monomers.

By "hydrophilic vinyl oligomer" is meant a low molecular weight polymer that has polar functional groups such as acid groups, or hydroxyl, carbonyl or amine groups. In the context of this invention, the acid value of the oligomer will be at least 45 mg KOH/g.

By "hydrophobic vinyl oligomer" and "hydrophobic vinyl polymer" is meant, respectively, a low and a high molecular weight polymer that have no functional groups that have affinity for water. In the context of this invention, they both will have an acid value equal or below 25 mg KOH/g.

By "vinyl polymer" is meant a polymer derived from vinyl monomers that contain a carbon-carbon double bond.

In the context of the present description, the term "biomass" refers to organic materials in which the carbon comes from non-fossil biological sources. Examples of bio-renewable materials include, but are not limited to, sugars, starches, corns, natural fibres, sugarcanes, beets, citrus fruits, woody plants, cellulose, lignocellulose, hemicellulose, potatoes, plant oils, other polysaccharides such as pectin, chitin, levan, and pullulan, and a combination thereof. In the context of the present description, the term "biomass" is also referred to as bio-based materials, (bio-) renewable materials or feedstock, or materials from renewable origin.

The vinyl polymer dispersion of this invention is made by a sequential process. In a first step, an (hydrophilic) vinyl oligomer OL1 is made with acid functionality by polymerizing the monomers for vinyl oligomer OL1 in the presence of one or more chain transfer agents (CTA). After this polymerization, oligomer OL1 is (partially or completely) dissolved by the addition of a base such as an alkali hydroxide, ammonia, an organic amine, or mixtures thereof. Preferably the base is a volatile base.

In a second step either the monomers for vinyl oligomer OL2 or the monomers for vinyl polymer P are polymerized in the presence of the (partially or completely) neutralized vinyl oligomer OL1.

More particularly, in a second step, the monomers for (hydrophobic) vinyl oligomer OL2 are polymerized in the presence of one or more chain transfer agents CTA' and in the presence of the (partially or completely) neutralized (hydrophilic) vinyl oligomer OL1, subsequently followed by a third step of polymerizing the monomers for (hydrophobic) vinyl polymer P in the presence of both the (partially or completely) neutralized (hydrophilic) vinyl oligomer OL1 and the (hydrophobic) vinyl oligomer OL2 formed in the previous step. Alternatively, in the second step, the monomers for (hydrophobic) vinyl polymer P are polymerized in the presence of the (partially or completely) neutralized (hydrophilic) vinyl oligomer OL1, subsequently followed by a third step of polymerizing the monomers for (hydrophobic) vinyl oligomer OL2 in the presence of one or more chain transfer agents CTA' and in the presence of both the (partially or completely) neutralized (hydrophilic) vinyl oligomer OL1 and the (hydrophobic) vinyl polymer P formed in the previous step.

In the context of the present description, "partially neutralized" vinyl oligomer OL1 refers to at least part of the acid groups present in vinyl oligomer OL1 being neutralized.

In the context of the present description, "completely neutralized" vinyl oligomer OL1 refers to all the acid groups present in vinyl oligomer OL1 being neutralized.

The vinyl oligomer OL1, vinyl oligomer OL2, and/or vinyl polymer P are preferably prepared by aqueous free radical emulsion polymerization, preferably each of vinyl oligomer OL1, vinyl oligomer OL2, and vinyl polymer P are prepared by aqueous free radical emulsion polymerization.

Optionally, in the process of the present invention, at least one chain transfer agent CTA" is added in the polymerization of vinyl polymer P, preferably no chain transfer agent CTA" is added (i.e. preferably the formed aqueous dispersion of vinyl polymer P comprises 0 wt % of CTA").

By the sequential process according to the invention, for forming the vinyl polymer dispersion of the invention, polymer particles with a multi-phase structure are formed in dispersion, the phase that is situated at the periphery of the particles comprising the (hydrophilic) vinyl oligomer OL1 and the interior of the particles comprising a blend of the (hydrophobic) vinyl oligomer OL2 and the (hydrophobic) vinyl polymer P.

With the current invention, i.e. by carrying out the emulsion polymerization as a three stage process where the polymer particles are made-up as a combination of a hydrophilic vinyl oligomer, a hydrophobic vinyl oligomer and a hydrophobic vinyl polymer, the gap between the minimal film-formation temperature (MFFT) of a waterborne coating and the glass-transition temperature (Tg) of the dispersed polymers is extended even further (compared to the prior art). Indeed, compared to the prior art (performing a two stage process with a hydrophilic oligomer and a hydrophobic polymer) the MFFT can now be further reduced with at least 5° C. Furthermore, clear or pigmented coatings comprising the dispersions from the present invention have an open time that is at least 5 minutes longer than those of the prior art.

In yet another alternative, the monomer mixture for vinyl oligomer OL2 can be dosed into a tank containing the monomer mixture for vinyl polymer P, and the resulting mixture is then dosed to a polymerization reactor where the (partially or completely) dissolved vinyl oligomer OL1 is already present, so creating a gradient in the molecular weight of the vinyl polymers thus formed. Creating a gradient in a polymer composition is known in the art as described in U.S. Pat. No. 6,617,389 B1 and U.S. Pat. No. 6,444,749 B2. Also the reverse mode of polymerizing is possible, i.e. dosing the monomer mixture for vinyl polymer P into a tank containing the monomer mixture for vinyl oligomer OL2, and then dosing the resulting monomer mixture to a polymerization reactor where the (partially or completely) dissolved vinyl oligomer OL1 is already present, so creating a gradient in the molecular weight of the vinyl polymers thus formed as well.

Preferably, the vinyl oligomer OL2 and/or vinyl polymer P have an acid functionality (as determined by ISO 3682) that is lower than that of vinyl oligomer OL1, with a difference in acid functionality of at least 20 mg KOH/gram, more preferably, the vinyl oligomer OL2 and vinyl polymer P each have an acid functionality that is lower than that of vinyl oligomer OL1, with a difference in acid functionality of at least 20 mg KOH/gram.

The weight ratio of vinyl oligomers OL1 and OL2 to vinyl polymer P (OL1:OL2:P) can range from 10:45:45 to 90:5:5, preferably from 60:20:20 to 40:30:30, most preferably the ratio being 55:22.5:22.5.

Vinyl Monomers M1, M1' and M1"

Acid-functional ethylenically unsaturated monomers M1, M1' and M1" can, each independently, be selected from the group consisting of carboxylic acid functional monomers and their precursors, such as acrylic acid, methacrylic acid, maleic acid anhydride, maleic acid or its half-esters, fumaric acid or its half esters, β-carboxyethyl acrylate, and itaconic acid or its half esters.

In the context of the present description, a "precursor" (or precursor monomer) refers to a chemical compound which participates in a chemical reaction that produces the desired monomer (i.e. a chemical compound giving rise to the desired monomer). Non-limited examples of precursor monomers are maleic anhydride, itaconic anhydride or (meth)acrylic acid anhydride that can hydrolyze forming carboxylic acid functional monomers.

M1, M1' and M1" can be the same or different. These monomers may be produced (derived) from petrochemical feedstock or from biomass. Bio-renewable M1, M1' and M1" monomers may be obtained fully or in part from bio-renewable sources. Bio-based acrylic acid can be produced from glycerol or hydroxy propionic acid, hydroxy propionic acid derivatives, or mixtures thereof. Bio-based itaconic acid is obtained by fermentation of sugars, and bio-based methacrylic acid can be derived from (bio-based) itaconic acid and citric acid by decarboxylation of itaconic acid catalyzed by solid transition-metal catalysts.

Other acid-functional, non-carboxylic acid groups-containing monomers can for example be sulphate or sulphonic monomers. As non-limiting examples may be mentioned 2-acrylamido-2-methylpropane sulphonic acid or the alkali, ammonia or amine salt thereof and the sodium salt of the adduct of allylglycidyl ether to sodium bisulphite, 2-sulfoethyl methacrylate or 1-(allyloxy)-2-hydroxypropane-1-sulfonic acid. Also phosphate or phosphonate functional monomers can be used. Non-limiting examples of such monomers are monoacryloxyethyl phosphate, SIPOMER® PAM-100 and SIPOMER® PAM-200 (both available from Solvay), 10-methacryloyloxydecyl dihydrogen phosphate (available from Kuraray Co., Ltd.), dimethyl (2-methacryloyloxyethyl) phosphonate and dimethyl (2-methacryloyl oxypropyl) phosphonate or Ethyl 2-[4-(dihydroxy phosphoryl)-2-oxabutyl] acrylate.

Vinyl Monomers M2, M2' and M2"

The non-ionic ethylenically unsaturated monomers M2, M2' and M2" preferably comprise styrene or styrene derivatives, such as alpha-methyl styrene, t-butyl styrene, vinyl toluene, o-, m-, and p-methyl styrene, o-, m-, and p-ethyl styrene; alkyl esters of (meth)acrylic acid, vinyl esters, or vinyl monomers containing hydroxyl groups. Preferred monomers include esters of acrylic and methacrylic acid, such as n-butyl (meth) acrylate, iso-butyl (meth)acrylate, tertiary butyl (meth)acrylate, methyl (meth) acrylate, ethyl (meth) acrylate, 2-ethylhexyl (meth) acrylate, lauryl(meth) acrylate, cycloalkyl (meth) acrylates, e.g. cyclohexyl (meth) acrylate, esters of itaconic acid, such as dimethyl, diethyl, dipropyl and dibutyl itaconate. These monomers may be produced from petrochemical feedstock. Alternatively they may be derived from renewable feedstock such as bio-based acrylic acid, methacrylic acid and methyl methacrylate. The alkanols used in the (trans)esterification can also be bio-derived. Non-limiting examples of such bio-based monomers are VISIOMER® Terra C13-MA, VISIOMER® Terra C17.4-MA, 2-octyl acrylate, isobornyl methacrylate and isobornyl acrylate.

A special class of bio-based monomers are those based on the formal or ketal of glycerol such as glycerol formal methacrylate (VISIOMER® GLYFOMA available from Evonik Resource Efficiency GmbH) or isopropylideneglycerol methacrylate (BISOMER® IPGMA available from Geo Specialty Chemicals).

Also dienes such as 1,3-butadiene, isoprene, or mixtures thereof can be used, either from petrochemical or renewable feedstock. Also, vinyl esters, such as vinyl acetate, vinyl alkanoate, or their derivatives, or mixtures thereof can be used in the monomer composition. Nitriles, such as (meth) acrylonitrile can also be used.

Bio-renewable M2, M2' and M2" monomers may be obtained fully or in part from bio-renewable sources.

M2, M2' and M2" can be the same or different. The M2, M2' and M2" used for obtaining the polymer dispersion PD of the invention are different than the M1, M1' and M1" used therein.

Vinyl Monomers M3, M3' and M3"

Monomers M3, M3' and M3", having functional groups other than acidic groups, can be used for crosslinking the polymer after film-formation. Monomers M3, M3' and M3" can be the same or different. Examples of these monomers include hydroxy-functional monomers such as hydroxyethyl (meth) acrylate, hydroxypropyl (meth) acrylate, hydroxybutyl (meth) acrylate, also monomers having latent hydroxy groups such as glycidyl methacrylate. Hydroxy-functional groups can be cross-linked with polyisocyanates at ambient to slightly elevated temperature. Examples of such polyisocyanates include hydrophilically modified types available under the tradenames BAYHYDUR® from Covestro and EASAQUA™ from Vencorex. Alternatively also hydrophobic polyisocyanates, or mixtures of hydrophilic and hydrophobic polyisocyanates, can be used. Crosslinking with blocked polyisocyanates requires higher temperatures. Further examples of crosslinking monomers include derivatives of (meth) acrylamide such as N-methylol (meth) acrylamide. Other examples of monomers are those that contain a carbonyl group such as acrolein, methacrolein, crotonaldehyde, 4-vinylbenzaldehyde, vinyl alkyl ketones of 4 to 7 carbon atoms such as vinyl methyl ketone. Further examples include acrylamido pivalaldehyde, methacrylamido pivalaldehyde, 3-acrylamidomethyl-anisaldehyde, diacetone acrylate and diacetone methacrylate, and keto-containing amides such as diacetone acrylamide. Adducts of carboxylic reactive monomers such as glycidyl (meth)acrylate and levulinic acid can also be used. Also monomers having an acetoacetoxy functional group can be used. Examples of such monomers are acetoacetoxyethyl methacrylate, acetoacetoxyethyl acrylate, acetoacetoxypropyl acrylate, allyl acetoacetate, and acetoacetoxybutyl acrylate.

Other olefinically unsaturated monomers that can be used are those monomers that contain a fatty acid derived ester group such as oleyl (meth)acrylate, linoleyl (meth)acrylate, and linolenyl (meth)acrylate, synthesis of these monomers is described in J. Appl. Poly. Sci., 30, 4571-4582 (1985), the analogue vinyl esters or monomers derived from the addition reaction between glycidyl (meth)acrylate and a fatty acid such as mentioned in British patent application GB 2237276. These monomers provide auto-oxidative drying properties to the vinyl polymer. Other monomers that can be used comprise the vinyloxazoline diesters of unsaturated fatty acids like such as DAPRO® FX 521 commercially available from Elementis Specialities. When crosslinking based on oxidative drying is being used, metal driers such as metal carboxylates where the metal is cobalt, lead, iron, manganese, vanadium, calcium, strontium, zirconium, zinc, lithium and barium, are being added to the polymer dispersion or later during the formulation of the coating. All monomers M3, M3' and M3" can be derived from petrochemical or from renewable feedstock.

Bio-renewable M3, M3' and M3" monomers may be obtained fully or in part from bio-renewable sources. Preferably, monomers M1, M1', M1", M2, M2', M2", M3, M3' and/or M3" are derived from bio-renewable sources, more preferably (partially) bio-renewable iso-butyl acrylate, glycerol formal methacrylate, isopropylidene glycerol methacrylate, isobornyl methacrylate, isobornyl acrylate, and/or alkyl itaconates, most preferably (partially) bio-renewable iso-butyl acrylate, glycerol formal methacrylate, isopropylidene glycerol methacrylate, isobornyl methacrylate, and/or alkyl itaconates.

In a preferred embodiment of this invention, the functional groups of monomer M3, M3' and M3", are carbonyl or acetoacetate groups.

In a particularly preferred embodiment the monomers M3, M3' and M3" are selected from the group consisting of acetoacetoxyethyl methacrylate, diacetone acrylamide, and mixtures thereof. Crosslinkers for use in combination with the above functional groups are known to those skilled in the art and comprise di- or polyamines, carbohydrazide and di- or poly carboxylic acid hydrazides. Crosslinking can occur at ambient or slightly elevated temperature. The crosslinker may be already incorporated in the vinyl polymer dispersions during or after the synthesis or can be added at a later stage, for example during the formulation of the coating.

Adhesion Promoting Ethylenically Unsaturated Mono-
mers M4' and M4"

Adhesion promoting ethylenically unsaturated monomers
M4' and M4" are generally monomers containing nitrogen
based functional groups such as amino, ureido or N-hetero-
cyclic groups. M4' and M4" can be the same or different.
Examples of such monomers are dimethyl aminoethyl(meth)
acrylate, diethyl aminoethyl(meth)acrylate, 3-dimethyl-
amino-2,2-dimethylpropyl-1-(meth)-acrylate, N-dimethyl-
aminomethyl(meth)acrylamide, N-(4-morpholinomethyl)
(meth)acrylamide, vinyl imidazole, and vinyl pyrrolidone.
Further mention may be made of compounds having a
pyrrolidine, piperidine, morpholine, piperazine, imidazole,
pyrrolidin-(2)-one or imidazolidin-2-one (ethylene urea)
ring. In this case preference is given to ureido-functional
monomers such as N-(2-methacryloxyethyl)ethylene urea,
1-(2-(3-allyloxy-2-hydroxypropylamino) ethyl)-imidazoli-
din-2-one, and 2-ethyleneureido-ethyl methacrylate.
Polyethylenically Unsaturated Monomer M5' and M5"

Polyethylenically unsaturated monomer M5' and M5" are
cross-linking agents having from two to six, ethylenically
unsaturated groups per molecule. These crosslinking mono-
mers already provide crosslinking to the polymer during the
polymerization and must not be confused with monomers
such M3, M3' and M3". M5' and M5" can be the same or
different.

Examples of these monomers are triallyl cyanurate, vinyl
or allyl acrylate or methacrylate, divinyl benzene, diol
diacrylates and diol dimethacrylates such as butylene glycol
(1,3) dimethacrylate, butylene glycol (1,3) diacrylate, eth-
ylene glycol dimethacrylate, and ethylene glycol diacrylate,
triol tri acrylates of triol trimethacrylates such as trimethyl-
olpropane trimethacrylate, trimethylolpropane triacrylate,
trimethylolpropane trimethacrylate, trimethylolpropane tria-
crylate and methylene bisacrylamide or methylene bismeth-
acrylamide. The quantity of these cross-linking agents used
generally ranges from 0 to 5 wt %, preferably from 0.01 to
5 wt %, more preferably from 0.01 to 3 wt %, even more
preferably from 0.1 to 3 wt %. The presence of a small
quantity of cross-linking agent can have a beneficial effect
on the film hardness and the adhesion properties.

Chain Transfer Agents CTA, CTA' and CTA"

Chain transfer agents CTA, CTA', CTA" are used to
control the molecular weight of the vinyl oligomers OL1 and
OL2 and, if required, vinyl polymer P. CTA, CTA' and CTA"
can be the same or different. Chain transfer agents can also
be hydrophobic or hydrophilic. Hydrophobic chain-transfer
agents are generally alkyl of aryl mercaptans (R-SH with
R=linear or branched C4 to C22 alkyl or aryl) or esters of
long chain alcohols with carboxylic acid functional mercap-
tans (R—O(O)C—X—SH with R=linear or branched C4 to
C22 alkyl or aryl and X=(CH2)n with n=1 to 6). Non-
limiting exemplary hydrophobic chain transfer agents are
n-butyl mercaptan, 2-ethylhexyl mercaptopropionate, n-do-
decylmercaptan, t-dodecylmercaptan, n-butyl mercaptopro-
pionate, n-octyl mercaptan, isodecyl mercaptan, octadecyl
mercaptan, allyl mercaptopropionate, allyl mercaptoacetate,
crotyl mercaptopropionate, crotyl mercaptoacetate. Hydro-
philic chain transfer agents usually have an hydroxyl or acid
functional group contributing to the (partial) water-solubility
of the vinyl oligomers. Non limiting examples of hydro-
philic chain transfer agents are: mercaptopropionic acid,
2-mercapto ethanol and mercaptoacetic acid.

Other, non-sulfur based chain transfer agent include halo-
genated hydrocarbons or catalytic chain transfer agents.
Also alpha-methyl styrene dimer or oligomers of alpha-
methyl styrene dimer can be used. Yet another method to synthesize polymer with a well-defined molecular weight is
the use of diarylethene. A commonly used diarylethene
includes diphenylethene.

Preferably, only chain transfer agents CTA and CTA' are
used, to only control the molecular weight of the vinyl
oligomers OL1 and OL2. In a preferred embodiment, a
combination of a hydrophobic and a hydrophilic mercaptan
is used in oligomer OL1 and/or OL2 in a weight ratio of
10/90 to 90/10, preferably 80/20 to 20/80 and most prefer-
ably 70/30 to 30/70. In a more preferred embodiment, a
combination of a hydrophobic and a hydrophilic mercaptan
is used in both oligomer OL1 and OL2 in a weight ratio of
10/90 to 90/10, preferably 80/20 to 20/80 and most prefer-
ably 70/30 to 30/70.

The content of renewable carbon present in the monomers
described above can be calculated from the monomers
structural formula or can be measured according to ASTM
D6866A. The bio-based carbon content is reported as the
fraction of total organic carbon content (TOC).

Other standardized methods to determine the fraction of
renewable carbon are ISO 16620-2 and CEN 16640.
Definition of the Vinyl Oligomers OL1, OL2 and Vinyl
Polymer P.

The water-soluble or water-dispersible crosslinkable
vinyl oligomer OL1 is an acid-functional oligomer built
from monomers M1, M2 and M3 and chain transfer agent
CTA. Said oligomer preferably has a number average
molecular weight, Mn, within the range of from 500 g/mole
to 50,000 g/mole, more preferably of from 500 g/mole to
25,000 g/mole, even more preferably 2,500 g/mole to 25,000
g/mole and most preferably 5,000 g/mole to 20,000 g/mole.
The number and weight average molecular weights (Mn and
Mw) of the oligomer may be determined by gel permeation
chromatography using a polymer, such as polystyrene, of
known molecular weight as a standard and tetrahydrofuran
(THF) containing 2 wt % acetic acid as an eluent. The
cross-linkable vinyl oligomer OL1 preferably has a glass
transition temperature within the range of 10 to 150° C.,
more preferably 20 to 140° C. and most preferably 25 to
130° C.

The Tg of oligomer OL1 herein stands for the calculated
glass transition temperature and is well known to be the
temperature at which a polymer changes from a glassy,
brittle state to a rubbery state. Tg values may be calculated
using the well-known Fox equation (T. G. Fox, Bull. Am.
Phys. Soc. 1, 123 (1956)), which is well known in the art,
and is represented by the formula:

$$1/Tg=W1/Tg(1)+W2/Tg(2)+W3/Tg(3)+ \ldots \ldots$$

wherein W1, W2, W3, etcetera, are the weight fractions of
the comonomers (1), (2), and (3), (etcetera), and Tg(1),
Tg(2), Tg(3) are the glass transition temperatures of their
respective homopolymers. Glass transition values for
homopolymers given in the Polymer Handbook, 4th edition
(editors: J. Brandrup, E. H. Immergut, E. A. Grulke, John
Wiley & Sons, Inc. 1999) are used to perform the calcula-
tion. The calculated Tg in degrees Kelvin may be readily
converted to degrees Celsius.

More particularly, the vinyl oligomer OL1 preferably has
a (calculated) glass transition temperature, as determined by
the Fox equation, within the range of 10 to 150° C., more
preferably 20 to 140° C. and most preferably 25 to 130° C.
The vinyl oligomer OL1 preferably has an acid number of at
least 45 mg KOH/g, more preferably at least 50 mg KOH/g
and most preferably at least 55 mg KOH/g (as determined by
ISO 3682).

Methods to influence the molecular weight in emulsion polymerization in order to achieve the desired number average molecular weight are well known to those skilled in the art. Molecular weight control of the oligomer may be provided by using chain-transfer agents such as the ones defined above.

The crosslinkable vinyl oligomer OL1 may be prepared by any known technique and may include directly synthesizing the oligomer in an aqueous process, i.e. in the presence of water (for example by emulsion polymerization, suspension polymerization, micro-suspension polymerization or mini emulsion polymerization), or by solution polymerization where the solvent may be water or any organic solvent that is miscible with water or that is removed by distillation after the oligomer is transferred to water. Preferably the vinyl oligomer OL1 is prepared by aqueous free radical emulsion polymerization. The free radical emulsion polymerization may be carried out as a batch or as a semi-continuous polymerization process.

A free-radical emulsion polymerization will usually require the use of a free-radical-yielding initiator to initiate the polymerization. Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents such as Na or K pyrosulphite or bisulphite, sodium formaldehyde sulphoxylate, BRUGGOLITE® FF6M (tradename from L. Brüggemann GmbH & Co. KG) or iso-ascorbic acid. Metal compounds such as Fe-EDTA (ethylene diamine tetra acetate) may also be used as part of the redox initiator system. Azo functional initiators may also be used such as azobis(isobutyronitrile), 2,2'-azo-bis(2-methyl butane nitrile); and 4,4'-azobis(4-cyanovaleric acid). It is possible to use an initiator system that partitions between the aqueous and organic phases, e.g. a combination of t-butyl hydroperoxide, iso-ascorbic acid or BRUGGOLITE® FF6M and Fe-EDTA. The amount of initiator or initiator system to use is conventional, e.g. within the range 0.05 to 6 weight % based on the total vinyl monomer(s) used. Preferred initiators for preparing the cross-linkable oligomer include ammonium persulphates, sodium persulphates, potassium persulphates, azobis (isobutyronitrile) and/or 4,4'-azobis(4-cyanovaleric acid). Most preferred initiators for preparing the crosslinkable oligomer OL1 include redox systems and persulphates as described above. A further amount of initiator may optionally be added at the end of the polymerization process to assist the removal of any residual vinyl monomers.

If the crosslinkable vinyl oligomer OL1 is made by means of emulsion polymerization, surfactants can be utilized in order to assist in the dispersion or the emulsification of the vinyl copolymer in water (even if it is self-dispersible). Suitable surfactants are ionic or non-ionic surfactants. Examples of anionic emulsifiers are: potassium laurate, potassium stearate, potassium oleate, sodium decyl sulphate, sodium dodecyl sulphate, and sodium rosinate. Examples of non-ionic emulsifiers are: linear and branched alkyl and alkylaryl polyethylene glycol ethers and thioethers and linear and branched alkyl and alkylaryl polypropylene glycol ethers and thioethers, alkylphenoxypoly(ethylenoxy) ethanols such as the adduct of 1 mole of nonylphenol to 5-50 moles of ethylene oxide, or the alkali salt or ammonium salt of the sulphate or the phosphate of said adduct.

Also surfactants containing an olefinically unsaturated group that can participate in a free radical polymerization can be used. Suitable polymerizable surfactants include hemi-esters of maleic anhydride of the formula M+.—OOC≡CH═CHCOOR wherein R is C6 to C22 alkyl and M+ is Na+, K+, Li+, NH4+, or a protonated or quaternary amine. Polyoxyethylene alkylphenyl ethers with an ethylenically unsaturated bond sold under the tradename NOIGEN® RN (from Dai-Ichi Kogyo Seiyaku Co., Ltd. of Japan) such as NOIGEN™ RN-10, NOIGEN™ RN-20, NOIGEN™ RN-30, NOIGEN™ RN-40, and NOIGEN™ RN-5065 or the sulphate thereof sold under the tradename HITENOL® BC (from Dai-Ichi Kogyo Seiyaku Co., Ltd. of Japan) such as HITENOL® BC-10, HITENOL® BC-1025, HITENOL® BC-20, HITENOL® BC-2020, HITENOL® BC-30. MAXEMUL® 6106 (available from Croda Industrial Specialties), which has both phosphonate ester and ethoxy hydrophilicity, a nominal C18 alkyl chain with an acrylate reactive group. Other representative reactive surfactants with phosphate ester functionalities suitable for such reactions include, but are not limited to, MAXEMUL® 6112, MAXEMUL® 5011, MAXEMUL® 5010 (all available from Croda Industrial Specialties). Alternative reactive surfactants suitable for use with various embodiments of the present invention include sodium allyloxy hydroxypropyl sulphonate (available from Solvay as SIPOMER® COPS-1), ADEKA REASOAP® SR/ER series such as ADEKA REASOAP® ER-10, ER-20, ER-30 and ER-40, ADEKA REASOAP® SR-10, SR-20, SR-30 (all available from Adeka Corporation., Ltd.) and allylsulphosuccinate derivatives (such as TREM® LF-40, available from BASF).

The amount of surfactant solids used in the synthesis of the oligomer OL1 is preferably 0.1 to 15 weight %, more preferably 0.1 to 8 weight %, still more preferably 0.1 to 5 weight %, especially 0.1 to 3 weight % based on the weight of OL1.

In a preferred embodiment of the invention, the surfactant used in the synthesis of vinyl oligomer OL1 is a co-polymerizable surfactant, preferably the amount of surfactant solids is 0.1 to 15 wt %, more preferably 0.1 to 8 weight %, still more preferably 0.1 to 5 weight %, even more preferably 0.1 to 3 weight % based on the weight of oligomer OL1. More preferably, the surfactant is partially derived from bio-renewable sources.

Vinyl oligomer OL2 and vinyl polymer P are synthesized by means of free radical aqueous emulsion polymerization in the presence of the (partially or completely) neutralized vinyl oligomer OL1.

Partial or complete solubilization of vinyl oligomer OL1 can be done with bases such as ammonia or amines such as 2-amino-2-methyl-1-propanol, 2-dimethylamino-ethanol and the like. Inorganic bases such as sodium-, potassium-, lithium hydroxide can also be used as are mixtures of organic and inorganic bases.

The number average molecular weight, Mn, of vinyl oligomer OL2 is between 500 g/mole to 50,000 g/mole, more preferably between 500 g/mole to 25,000 g/mole, even more preferably 2,500 g/mole to 25,000 g/mole and most preferably 5,000 g/mole to 20,000 g/mole. The number and weight average molecular weights (Mn and Mw) of the oligomer may be determined by gel permeation chromatography using tetrahydrofuran and 2 wt % acetic acid as eluent and using polystyrene standards. The vinyl oligomer OL2 preferably has a (calculated) glass transition temperature, as determined by the Fox equation, within the range of −50 to 80° C., more preferably –30 to 60° C. and most preferably –20 to 40° C. The acid value of vinyl oligomer OL2 (as determined by ISO 3682) is at least 20 mg KOH/g lower than that of vinyl oligomer OL1.

The weight average molecular weight, Mw, of the dispersion of the invention (comprising vinyl oligomer OL1, vinyl oligomer OL2 and vinyl polymer P) is between 25,000 g/mole to more than 1,000,000 g/mole, preferably between 35,000 g/mole and 250,000 g/mole, more preferably between 35,000 g/mole and 75,000 g/mole, even more preferably between 40,000 g/mole and 65,000 g/mole; the weight average molecular weight Mw may be determined by gel permeation chromatography using tetrahydrofuran and 2 wt % acetic acid as eluent and using polystyrene standards.

The vinyl polymer P in the dispersion of the invention preferably has a (calculated) glass transition temperature, as determined by the Fox equation, within the range of –50 to 80° C., more preferably –30 to 60° C. and most preferably–20 to 40° C. The acid value of vinyl polymer P (as determined by ISO 3682) is at least 20 mg KOH/g lower than that of vinyl oligomer OL1.

For the synthesis of vinyl oligomer OL2 and vinyl polymer P, auxiliary surfactants and initiator systems as described above can be used.

The order in which vinyl oligomer OL2 and vinyl polymer P are synthesized is not important as long as it is done in the presence of the (partially or completely) dissolved vinyl oligomer OL1, so vinyl oligomer OL2 can be polymerized after the synthesis and solubilizing of vinyl oligomer OL1, followed by the polymerization of vinyl polymer P, or the other way around.

The present invention also refers to a process for synthesizing the aqueous vinyl polymer dispersion PD.

The present invention also refers to a coating composition comprising the aqueous vinyl polymer dispersion PD. This coating composition can have a pH between 2.0 to 9.0, preferably 4.5 to 8.5, most preferably 7.5 to 8.0. The coating composition described above can preferably be formulated to a paint by adding the usual paint additives. Such composition can still be referred to as a coating composition. The coating composition may further comprise one or more organic solvents, sometimes also referred to a coalescing aids, that aid film-formation. When an organic solvent is used, water miscible solvents are preferred. The amount of organic solvent shall be chosen in such a way to provide a coating composition with a low volatile organic content (VOC), and preferably comprises less than 130 g/liter, preferably less than 100 g/liter coating composition, including water, of volatile organic compounds, as calculated by ISO method 11890-2 in the form ready to use.

According to one embodiment, the coating composition comprising the aqueous vinyl polymer dispersion PD may further comprise at least one or more conventional ingredients selected from the group consisting of non-vinyl polymers, pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, wetting agents and the like, and mixtures thereof.

The invention also relates to a paint composition (or paint formulation) comprising the coating composition and 1 to 70 wt % pigment or filler. Preferably the pigment used is rutile titanium dioxide, most preferably with an oil absorption below 25 g oil/100 g of pigment as determined by ASTM D281-12(2016).

The coating composition according to the invention may also comprise waterborne co-binders such water dilutable or dispersed alkyd resins, polyurethane dispersions, other acrylic or styrene acrylic dispersions, epoxy emulsions and the like.

The coating composition according to the invention may further comprise: from 0.1 wt % up to 20 wt %, preferably up to 15, 10 or 5 wt %, of a polyisocyanate crosslinker; from 0.1 wt % up to 20 wt %, preferably up to 5 wt %, of a polyamine or polyhydrazide crosslinker; from 0.1 wt % up to 10 wt % of a silane crosslinker; and/or from 0.1 wt % up to 10% of an (meth)acryloyl oligomer.

As mentioned earlier the coating compositions in accordance with the present invention are suitable for a variety of coatings uses, for example, as paint, impregnating, sealing and bonding compositions. A preferred application is as a primer, topcoat, or clear-coat. The coating compositions may be applied to a substrate in any convenient manner such as, for example, by brushing, spraying or dipping. Suitable substrates include metals, wood, board, plastics and leather. The coating compositions are especially suitable for decorative and industrial wood applications.

The coating composition of the present invention advantageously combines MFFT, Tg, and open time, and is furthermore preferably prepared, at least in part, from bio-renewable monomers, bio-based surfactants and other renewable materials such as thickener, pigments and dyes, and bio-based co-solvents.

The present invention also refers to an article or (part of) a substrate coated with the coating composition.

The present invention also refers to a method of making a coating composition comprising the step of blending the aqueous vinyl polymer dispersion PD with at least one or more conventional ingredients selected from the group consisting of non-vinyl polymers, pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, wetting agents and the like, and mixtures thereof.

According to one embodiment the coating composition is preferably a pigmented formulation.

The invention will be explained in more detail by the following, non-limiting examples.

All the previous described embodiments may be combined within reason.

EXAMPLES

Test Methods
Solids Content of a Polymer Dispersion

The content of non-volatile matter is the weight of the residue of a sample when heated under described conditions in an oven. It is expressed as a percentage of the original sample weight. This method follows ASTM 4758-92 and ISO 3251.

Transparency Value of a Polymer Dispersion

The clarity of a polymer dispersion was determined by measuring the transparency of the dispersion using a LICO 200 spectrophotometer (HACH LANGE). The LICO 200 spectrophotometer measures the transmittance of samples within the range 380-720 nm with the application of standard light C (as defined in DIN standard 5033). The transmittance (T) is the ratio I/Io of the intensity of the light emerging from the sample over the intensity of the incident radiation (Io). The transmittance can be expressed as a transparency value $dL=T*100$ where $dL=100$ is clear and $dL=0$ is opaque. The spectrophotometer uses a 11 millimeter round sample cuvette.

Molecular Weight Determination

The molecular weight and molecular weight distribution was determined using size exclusion chromatography (gel permeation chromatography). The size-exclusion apparatus used is an Alliance system consisting of a pump, autosampler and He-degasser (Degasys DG-1210 from Uniflows), equipped with a PLgel 5 μm MIXED-C 600×7.5 mm Column and a PLgel 5 μm guard column (50×7.5 mm–Polymer Laboratories). The column oven (Separations Analytical Instruments) was set at 30° C. Tetrahydrofuran (THF— Extra Dry, Biosolve 206347)+2% acetic acid (Baker 6052) is used as eluent at a flow-rate of 0.8 ml/min. Carbon disulfide (Backer) is used as a marker. A Waters 410 refractive index is used as detector. The injection volume is 100 μl at a concentration of 1.5 mg/ml. Polystyrene standards (Polymer Laboratories, EASICAL® PS-1, 2010-0501 (molecular weight range 580 g/mol-8,500,000 g/mol) and EASI-CAL® PS-2, 2010-0601 (molecular weight range 580 g/mol-400,000 g/mol)) were used for calibration using a third order polynomial. Software used for data-analysis is Empower (Waters). The polydispersity (abbreviated by disp.) is determined by the ratio of Mw/Mn.

Determination of MFFT

The MFFT was determined by using a Rhopoint MFT-Bar 60 which has a temperature range from 0° C. to 60° C. Films were applied with a wet film thickness of 25 microns. The MFFT was the lowest temperature at which the film showed no cracks.

Determination of Particle Size

Particle size was determined by dynamic light scattering using a Malvern Zetasizer model Nano-S90. The Z-average value was reported as the particle size. The z-average diameter is the mean hydrodynamic diameter and is calculated according to the International Standard on dynamic light scattering ISO13321.

Determination of pH

The pH was measured using a ProLine QIS pH meter according to DIN 19268.

Determination of Brookfield Viscosity

Brookfield viscosity is measured with a Brookfield RVT viscometer at a temperature of 23±1° C., according to ISO 2555-1974.

Measurement of Open Time

The open time of a pigmented paint is measured as follows: 125 μm of the wet paint is applied on an A3 size LENETA® test chart. The temperature during the testing is 22±0.5° C. and the relatively humidity of about 50%. The applied film is brushed through three strokes (on the same part) at the left of the chart. The second brush through is made at 5 minutes. The third after 10 minutes and then every 2 minutes. The last time when the paint film reflowed is recorded as the open time (or otherwise said the open time is the time where the brush marks do not level out anymore). Open time is reported in minutes.

Properties of Monomers Used in the Examples

| Monomer | Tg (K) | % Bio-based |
|---|---|---|
| Methyl methacrylate | 378 | 0 |
| Methacrylic acid | 501 | 0 |
| n-Butyl methacrylate | 293 | 0 |
| n-Butyl acrylate | 219 | 0 |
| Styrene | 373 | 0 |
| Iso-Butyl acrylate (partially bio-based) | 249 | 57 |
| Glycerol formal methacrylate (partially bio-based) | 353 - 368 (two isomers)* | 38 |

-continued

| Monomer | Tg (K) | % Bio-based |
|---|---|---|
| Isopropylidene glycerol methacrylate (partially bio-based) | 318 | 30 |
| Dimethyl itaconate (fully bio-based) | 366** | 100 |
| Dibutyl itaconate (fully bio-based) | 285*** | 100 |
| Isobornyl methacrylate | 423* | 71 |

*Information from Evonik.
**http://polymerdatabase.com/polymers/polydimethylitaconate.html
***http://polymerdatabase.com/polymers/polydin-butylitaconate.html Raw Materials Used in Coating Formulating Examples

| | |
|---|---|
| BYK ® 024 | Anti-foaming agent from BYK Chemie |
| KRONOS ® 2190 | Titanium dioxide (rutile) from Kronos |
| DOWANOL ™ DPM | Co-solvent from Dow Chemical |
| DISPERBYK ® 190 | Dispersing agent from BYK Chemie |
| RHEOVIS ® PE1320 | Associative thickener from BASF |
| BORCHI ® Gel L 75N/water 1:1 | Polyurethane thickener from Borchers |

Example 1: Synthesis of Vinyl Oligomer OL1

In a double-walled reactor with a mechanical stirrer, nitrogen supply, cooler and inlet for monomer and initiator feed lines, 1310.74 grams of demineralized water and 15.03 grams of ADEKA REASOAP SR-1025 is weighed in and heated to 70° C. under a nitrogen blanket. A monomer pre-emulsion is made by dissolving 41.97 grams of ADEKA REASOAP® SR-1025 and 98.97 grams of diacetone acrylamide in 340.7 grams of demineralized water. To this solution are added under stirring:

| Ingredient | Weight (g) |
|---|---|
| Methyl methacrylate | 549.44 |
| Methacrylic acid | 74.04 |
| n-Butyl methacrylate | 124.99 |
| n-Octyl mercaptan | 9.37 |
| 2-Mercapto ethanol | 4.8 |

When the contents of the reactor have reached 70° C., 5% of the pre-emulsion is added over a period of 5 minutes. The heating is continued to 80° C. When the contents of the reactor have reached 80° C., a solution of 0.74 grams of ammonium persulphate in 32.99 grams of demineralized water is added to the reactor. An exothermal reaction occurs. When the exotherm has subsided, heating is continued until a temperature of 85° C. is reached. The remainder of the pre-emulsion is fed into the reactor over a period of 60 minutes. Simultaneously a solution of 1.92 grams of ammonium persulphate in 121.51 grams of demineralized water is dosed over a period of 70 minutes. The container for the pre-emulsion and feed lines are rinsed with 75.14 grams of demineralized water and the container of the persulphate solution and feed lines with 16.49 grams of demineralized water. The contents of the reactor are kept at 85° C. for 30 minutes. A solution of 52.78 grams of ammonia (25% aqueous) in 111.61 grams demineralized water is dosed into the reactor over a period of 30 minutes. The container is rinsed with 16.49 grams of demineralized water that is added to the reactor. The batch is cooled to room temperature and is stored in suitable containers and is used for the following experiments.

The Properties of the Oligomer OL1 Solution are given Below:

| Property | Value | Unit |
|---|---|---|
| Solids content | 28.8 | % |
| pH | 8.1 | |
| Particle size | 46.4 | nm |
| Transparency | 82.1 | % |

The molecular weight of OL1 was measured as described above. The number average molecular weight, Mn was 7,000 g/mole and the weight average molecular weight, Mw was 16,500 g/mole.

Examples 2-4 and Comparative Example 5: Oligomer Stabilized Polymer Dispersions Using the oligomer OL1 from Example 1, a number of oligomer stabilized polymer dispersions were made.

Ingredients and weights (in g) are given in the table below. In a double-walled reactor with a mechanical stirrer, nitrogen supply, cooler and inlet for monomer and initiator feed lines, a pre-charge of the oligomer OL1 from Example 1 (portion "A") was heated-up to a temperature of 45° C. Next, a blend of monomers was made with ingredients as indicated in portion "B". This monomer mixture was divided 50:50 over two containers (container 1 and container 2). A mercaptan blend with ingredients as indicated in portion "C" is only added to container 2. When the contents of the reactor reach the temperature of 45° C., the contents of container 1 are fed into the reactor over a period of 5 minutes. The reaction mass is homogenized for 40 minutes and the ingredients under portion "E" are added. 50% of the solution of ingredients under portion "F" is added, followed by 15% of the solution made up of the ingredients under portion "G". An exothermal reaction raises the temperature of the reactor to 55-57° C. The batch is kept at this temperature for 30 minutes. After this, the batch is cooled down to a temperature below 50° C. and the contents of container 2 are added to the reactor in 5 minutes. Container 2 is rinsed with demineralized water (portion "D"). The contents of the reactor are homogenized for 40 minutes at 50° C. after which the initiator mixture from portion "I" is added to the reactor, followed by the remainder of the solution from portion "F". After adding 15% of the solution from portion "G", an exothermal reaction raises the temperature of the batch to 60° C. When the batch reaches 60° C., the rest of the solution from portion "G" is dosed into the reactor over a period of 30 minutes. The empty container that contained the raw materials of portion "G" is rinsed with demineralized water (portion "H"). The temperature of the batch is maintained at 60° C. The adipic acid dihydrazide from portion "J" is added, followed by a rinse of the addition funnel with demineralized water (portion "K"). The contents of the reactor are mixed for another 30 minutes to ensure that all of the adipic acid dihydrazide has dissolved. The batch is then cooled to ambient temperature. When the temperature has dropped below 40° C., the solution from portion "L" is added and the empty container that contained the solution of portion "L" is rinsed with the demineralized water from portion "M". The contents of the reactor are filtered over a 60 mesh filter and are stored in suitable recipients.

| | Ingredients | Ex. 2 | Ex. 3 | Ex. 4 | Comp. Ex. 5 |
|---|---|---|---|---|---|
| A | Oligomer from experiment 1 | 732.6 | 731.99 | 729.05 | 747.37 |
| B | Divinyl benzene | 3.14 | 3.13 | 3.12 | 3.2 |
| | Methyl methacrylate | 59.25 | 59.21 | 58.97 | 60.45 |
| | Styrene | 6.58 | 6.57 | 6.55 | 6.71 |
| | n-Butyl acrylate | 141.24 | 141.13 | 140.56 | 144.09 |
| C | n-Octyl mercaptan | 1.15 | 1.74 | 4.6 | 0 |
| | 2-Mercapto ethanol | 0.59 | 0.89 | 2.36 | 0 |
| D | Demineralized water | 24.26 | 24.24 | 24.14 | 24.75 |
| E | Demineralized water | 4.03 | 4.02 | 4.01 | 4.11 |
| | tert. Butyl hydroperoxide (70% aq.) | 0.08 | 0.08 | 0.08 | 0.08 |
| F | Demineralized water | 14.32 | 14.31 | 14.25 | 14.61 |
| | Iron sulphate heptahydrate | 0.01 | 0.01 | 0.01 | 0.01 |
| | Ethylenediaminetetraacetic acid, di sodium salt | 0.01 | 0.01 | 0.01 | 0.01 |
| G | Demineralized water | 45.92 | 45.88 | 45.7 | 46.84 |
| | D-Isoascorbic acid | 0.32 | 0.32 | 0.32 | 0.32 |
| | Ammonia (25% aq.) | 0.49 | 0.49 | 0.49 | 0.5 |
| H | Demineralized water | 2.24 | 2.24 | 2.23 | 2.28 |
| I | Demineralized water | 4.03 | 4.02 | 4.01 | 4.11 |
| | tert. Butyl hydroperoxide (70% aq.) | 0.39 | 0.39 | 0.39 | 0.4 |
| J | Adipic acid dihydrazide | 10.74 | 10.73 | 10.69 | 10.96 |
| K | Demineralized water | 15.66 | 15.65 | 15.59 | 15.98 |
| L | ACTICIDE ® MV* | 1.02 | 1.02 | 1.01 | 1.04 |
| | ACTICIDE ® M20* | 0.54 | 0.53 | 0.53 | 0.55 |
| | Demineralized water | 9.17 | 9.17 | 9.13 | 9.36 |
| M | Demineralized water | 2.24 | 2.24 | 2.23 | 2.28 |

*Biocides available from Thor Group Limited

The properties of the polymer dispersions from Examples 2 to Comparative Example 5 are given below:

| | Value | | | | |
|---|---|---|---|---|---|
| Property | Ex. 2 | Ex. 3 | Ex. 4 | Comp. Ex. 5 | Unit |
| Solids content | 40.1 | 40.2 | 40.5 | 40 | % |
| pH | 7.97 | 7.93 | 7.92 | 7.99 | |
| Particle size | 56 | 55.5 | 56.7 | 56.4 | nm |
| Brookfield viscosity | 34.4 | 34.3 | 41.3 | 32.4 | cPa · s |
| Minimal film-formation temperature | 5 | 6 | 5 | 11 | ° C. |
| Transparency | 74.5 | 76.9 | 70.2 | 66.5 | % |

From this table above, it becomes clear that for identical amounts of ethylenically unsaturated monomers in the polymer composition, the polymer dispersions according to the invention have a minimal film-forming temperature that is 5 to 6° C. lower than the minimal film-forming temperature of the comparative example.

Examples 6-8 and Comparative Example 9: Pigmented Coatings Based on Examples 2-4 and on Comparative Example 5

A mill base was made according to the following recipe.

| Ingredient | Weight (g) |
|---|---|
| Water | 42.2 |
| Propylene glycol | 10.0 |
| DISPERBYK ® 190 | 11.4 |
| BYK ® 024 | 4.1 |
| KRONOS ® 2190 | 189.0 |

The ingredients were milled on high speed impeller until a fineness <10 μm is obtained. The maximum temperature of 40° C. may not be exceeded. Pigmented coatings based on Examples 2-4 and Comparative Example 5 were made according to the table below.

| Example | Ex. 6 | Ex. 7 | Ex. 8 | Comp. Ex. 9 |
|---|---|---|---|---|
| Binder from ex. 2 | 89.5 | — | — | — |
| Binder from ex. 3 | — | 89.5 | — | — |
| Binder from ex. 4 | — | — | 89.5 | — |
| Binder from Comparative Ex. 5 | — | — | — | 89.5 |
| Mill-base | 38.5 | 38.5 | 38.5 | 38.5 |
| DOWANOL ™ DPM | 4 | 4 | 4 | 4 |
| water | 11.8 | 11.8 | 11.8 | 11.8 |
| BYK ® 024 | 1.5 | 1.5 | 1.5 | 1.5 |
| RHEOVIS ® PE1320 | 3.0 | 2.7 | 2.8 | 3.0 |
| BORCHI ® Gel L 75N/water 1:1 | 0.5 | 0 | 1.1 | 0.8 |

As can be seen from the table below, the paints have a Newtonian rheology.

| Example | | Ex. 6 | Ex. 7 | Ex. 8 | Comp. Ex. 9 |
|---|---|---|---|---|---|
| Brookfield Viscosity | 6 rpm | 2000 | 1800 | 2090 | 2600 |
| (mPa · s) | 60 rpm | 1900 | 1700 | 2000 | 2510 |
| High shear viscosity (P) | | 2.6 | 2.5 | 2.2 | 2.7 |
| Open time (minutes) | | 18 | 16-18 | 16-18 | 12 |
| Layer thickness 1st layer (micron) | | 40 | 35 | 35 | 35 |

Examples 10-16: Partial Replacement of Fossil Based Monomers by Partially Bio-Based Iso-Butyl Acrylate Bio-based iso-butyl acrylate was sourced from BCH Brühl-Chemikalien Handel GmbH (DE). Using an oligomer OL1, based on the formulation used in from Example 1, 3 polymer dispersions were made with the monomer compositions given in the table below for the vinyl oligomer OL2 and vinyl polymer P. The oligomer OL1 used for these three examples was the same. The synthesis procedure is the same as for Examples 2-4. Example 10 is comparative, Examples 11-13 are according to the invention.

| Polymer | Ingredient | Ex. 10 C | Ex. 11 | Ex. 12 |
|---|---|---|---|---|
| OL1 | Oligomer from Example 1 | 1359 | 900 | 900 |
| Vinyl | Divinyl benzene | — | 1.93 | 1.93 |
| oligomer | Methyl methacrylate | — | 36.40 | 36.40 |
| OL2 | Styrene | — | 4.04 | 4.04 |
| | iso-Butyl acrylate (partially bio-based) | — | 86.76 | 86.76 |
| | n-Octyl mercaptan | — | 1.41 | 2.13 |
| | 2-Mercapto ethanol | — | 0.72 | 1.09 |
| Vinyl | Divinylbenzene | 5.82 | 1.93 | 1.93 |
| polymer | Methyl methacrylate | 109.91 | 36.40 | 36.40 |
| P | Styrene | 12.20 | 4.04 | 4.04 |
| | iso-Butyl acrylate (partially bio-based) | 261.98 | 86.76 | 86.76 |

For all examples, the amount of bio-based carbon is around 17.4%.

The properties for the polymer dispersions 10 to 12 are given in the table below.

| Experiment | Solids Content (%) | pH | PS (nm) | Visc. (mPa · s) | MFFT (° C.) |
|---|---|---|---|---|---|
| Ex. 10 C | 40.4 | 7.8 | 56 | 388 | 35 |
| Ex. 11 | 39.8 | 7.9 | 66 | 298 | 23 |
| Ex. 12 | 39.7 | 7.9 | 68 | 235 | 21 |

Again it can be seen that, compared to the Comparative Example 10, both Examples 11 and 12, according to the invention show a decrease in MFFT of more than 10° C.

The dispersions were further characterized for their molecular weight:

| Experiment | Mn | Mw | Mw/Mn |
|---|---|---|---|
| Ex. 10 C | 7,524 | 494,756 | 65.75 |
| Ex. 11 | 8,725 | 337,541 | 38.69 |
| Ex. 12 | 7,360 | 285,093 | 38.73 |

The vinyl polymer dispersions form Example 10 C and Example 11 were formulated into a clear varnish:

| | Weight (g) | |
|---|---|---|
| Ingredient | Example 13 C | Example 14 |
| Polymer Dispersion from Example 10 C | 100 | — |
| Polymer Dispersion from Example 11 | — | 100 |
| Water | 20 | 20 |
| Butyl diglycol | 6 | 6 |
| BYK ® 024 | 1 | 1 |
| BORCHI ® Gel L 75N/water (1:1) | 3.8 | 3.8 |

The results are given below:

| Results | Example 13 C | Example 14 |
|---|---|---|
| Appearance | 4-5 | 4-5 |
| Gloss 20°/60° | 66/83 | 72/86 |
| Blocking resistance | 8 | 8 |
| König hardness | 136" | 109" |
| Chemical resistance | | |
| Water | 5 | 5 |
| Alcohol 50% | 2 | 2 |
| Detergent Ajax | 5 | 5 |
| Coffee | 5 | 5 |

Ranking: 0: poor, 5: excellent
Blocking: 0: poor, 10: good

The Examples 10 C and 11 were also formulated in a white pigmented paint. The pigment dispersion used consisted of:

| Ingredient | Weight (g) |
|---|---|
| Water | 42.2 |
| Propylene glycol | 10 |
| DISPERBYK ® 190 | 11.4 |
| BYK ® 024 | 4.1 |
| KRONOS ® 2190 | 189 |

The mixture was grinded on a high speed impeller until a fineness of <20 μm is obtained. The maximum temperature should not exceed 40° C.

The total composition consisted of:

|  | Weight (g) | |
| Ingredient | Example 15 C | Example 16 |
| --- | --- | --- |
| Polymer dispersion from ex. 10C | 89.5 | — |
| Polymer dispersion from ex. 11 | — | 89.5 |
| Mill-base | 38.5 | 38.5 |
| DOWANOL ™ DPM | 4 | 4 |
| Water | 11.8 | 11.8 |
| BYK ® 024 | 1.5 | 1.5 |
| RHEOVIS ® PE1320 | 3.2 | 3.4 |
| BORCHI ® Gel L 75N/water (1:1) | 1.2 | 1.0 |

The results of the paint evaluation is given below:

| Property | | Example 15 C | Example 16 |
| --- | --- | --- | --- |
| Brookfield Viscosity (mPa · s) | 6 rpm | 4000 | 2800 |
| | 60 rpm | 3630 | 2750 |
| High shear viscosity (P) | | 2.4 | 2.6 |
| Open time first layer (32% RH, 21° C., min) | | 16 | 18 |
| Open time second layer (min) | | 10-12 | 12 |

Again it can be noticed that both paints have a Newtonian rheology but the viscosity of the paint based on Example 11 is less viscous than that made with the polymer dispersion of Comparative Example 10 C. The open-time for both paints is comparable.

Example 17: Partial Replacement of Fossil Based Monomers by Partially Bio-Based Glycerol Formal Methacrylate and Isopropylidene Glycerol Methacrylate In a first step an oligomer OL1 is synthesized as follows: In a double-walled reactor with a mechanical stirrer, nitrogen supply, cooler and inlet for monomer and initiator feed lines, 593.7 grams of demineralized water and 6.81 grams of ADEKA REASOAP® SR-1025 is weighed in and heated to 70° C. under a nitrogen blanket. A monomer pre-emulsion is made by dissolving 19.01 grams of ADEKA REASOAP® SR-1025 and 44.83 grams of diacetone acrylamide in 154.32 grams of demineralized water. To this solution are added under stirring:

| Ingredient | Weight (g) |
| --- | --- |
| Glycerol formal methacrylate (partially bio-based) | 62.22 |
| Methyl methacrylate | 186.65 |
| Methacrylic acid | 33.54 |
| Isopropylidene glycerol methacrylate (partially bio-based) | 14.15 |
| n-Butyl methacrylate | 42.46 |
| n-Octyl mercaptan | 4.24 |
| 2-Mercapto ethanol | 2.17 |

When the contents of the reactor have reached 70° C., 5% of the pre-emulsion is added over a period of 5 minutes. The heating is continued to 80° C. When the contents of the reactor have reached 80° C., a solution of 0.33 grams of ammonium persulphate in 14.94 grams of demineralized water is added to the reactor. An exothermal reaction occurs. When the exotherm has subsided, heating is continued until a temperature of 85° C. is reached. The remainder of the pre-emulsion is fed into the reactor over a period of 60 minutes. Simultaneously a solution of 0.87 grams of ammonium persulphate in 55.04 grams of demineralized water is dosed over a period of 70 minutes. The container for the pre-emulsion and feed lines are rinsed with 34.03 grams of demineralized water and the container of the persulphate solution and feed lines with 7.47 grams of demineralized water. The contents of the reactor are kept at 85° C. for 30 minutes. A solution of 23.91 grams of ammonia (25% aqueous) in 50.55 grams demineralized water is dosed into the reactor over a period of 30 minutes. The container is rinsed with 7.47 grams of demineralized water that is added to the reactor. The batch is cooled to room temperature and is stored in suitable containers and is used for the following experiments. The oligomer had a number average molecular weight of 5,761 g/mole.

Using this oligomer OL1, a vinyl polymer P and an oligomer OL2 were polymerized using the procedure of Example 2 and the monomers given in the table below.

| | Monomer | Weight (g) |
| --- | --- | --- |
| Vinyl polymer P | Divinylbenzene | 2.91 |
| | Glycerol formal methacrylate (partially bio-based) | 15.27 |
| | Methyl methacrylate | 41.22 |
| | Styrene | 4.58 |
| | n-Butyl acrylate | 130.99 |
| Vinyl oligomer OL2 | n-Octyl mercaptan | 2.11 |
| | 2-Mercaptoethanol | 1.08 |
| | Divinylbenzene | 2.91 |
| | Glycerol formal methacrylate (partially bio-based) | 15.27 |
| | Methyl methacrylate | 41.22 |
| | Styrene | 4.58 |
| | n-Butyl acrylate | 130.99 |

The properties of this polymer dispersion are as follows: solids content 40.2%, pH 7.7, particle size 82 nm, Brookfield viscosity 490 mPa·s, MFFT 0° C. and a transparency of 57%. Open time tested in a pigmented paint formulated according to Example 6 was 19 minutes for the first layer (ca. 45 micron wet) and 10 minutes for the second layer. Persoz hardness was 80 seconds. The amount of bio-based carbon is around 8.0%

Example 18: Partial Replacement of Fossil Based Monomers by Fully Bio-Based Alkyl Itaconates Dimethyl itaconate and dibutyl itaconate were used based on itaconic acid produced by means of fermentation and bio-based methanol and n-butanol.

In a first step an oligomer was synthesized using the procedure of Example 13. The amount of ADEKA REASOAP® RS1025 in the reactor pre-charge was 6.81 g and in the pre-emulsion for OL1 19.01 g. The monomer composition used is given in the table below.

| Ingredient | Weight (g) Ex. 18 |
| --- | --- |
| Diacetone acrylamide | 44.83 |
| Methyl methacrylate | 186.65 |
| Dimethyl itaconate (bio-based) | 62.22 |
| Methacrylic acid | 33.54 |
| n-Butyl methacrylate | 42.46 |
| Dibutyl itaconate (bio-based) | 14.15 |
| n-Octyl mercaptan | 4.24 |
| 2-Mercapto ethanol | 2.17 |

The number and weight average molecular weights of the oligomer OL1 was:

| Oligomer OL1 | Mn | Mw | disp. (Mw/Mn) |
|---|---|---|---|
| Example 18 | 2,543 | 14,056 | 5.53 |

Using this oligomer, a vinyl polymer P and an oligomer OL2 were polymerized using the procedure of Example 2 and the monomers given in the table below.

| | Monomer | Weight (g) Ex. 18 |
|---|---|---|
| Vinyl polymer P | Divinylbenzene | 2.91 |
| | Styrene | 6.10 |
| | Methyl methacrylate | 41.22 |
| | Dimethyl itaconate (bio-based) | 13.74 |
| | n-Butyl acrylate | 130.99 |
| Vinyl oligomer OL2 | Divinylbenzene | 2.91 |
| | Styrene | 6.10 |
| | Methyl methacrylate | 41.22 |
| | Dimethyl itaconate (bio-based) | 13.74 |
| | n-Butyl acrylate | 130.99 |
| | n-Octyl mercaptan | 2.11 |
| | 2-Mercapto ethanol | 1.08 |

The properties for Example 18 are given below:

| Property | Ex. 18 |
|---|---|
| Solids content (%) | 39.5 |
| pH | 7.4 |
| Particle size (nm) | 82 |
| Viscosity (mPa · s) | 45 |
| MFFT (° C.) | 7 |
| Bio-based Carbon (%) | 12 |

The molecular weights after the different stages in the synthesis process are given in the following table.

| | After polymerization of OL1 + P | | After polymerization of OL1 + P + OL2* | |
|---|---|---|---|---|
| Stage | Mn | Mw | Mn | Mw |
| Ex. 18 | 4,558 | 420,728 | 4,947 | 429,371 |

*prior to the addition of adipic dihydrazide

Clear varnishes were made with the polymer dispersions of Examples 2, 5C and 18 using the formulation given before. The table below gives some of the properties of these varnishes:

| Polymer dispersion from | Ex. 5 C | Ex. 2 | Ex. 18 |
|---|---|---|---|
| Appearance on LENETA ® | 4-5 | 4-5 | 4-5 |
| Early blocking | 7 | 7 | 7 |
| Early water resistance | | | |
| 1 hour | 4-5/5 | 5/5 | 5/5 |
| 2 hours | 4-5/5 | 5/5 | 5/5 |
| 3 hours | 4-5/5 | 4-5/5 | 4-5/5 |
| 4 hours | 4/5 | 4/5 | 4/5 |
| Gloss 20°-60° | 68-84 | 70-85 | 68-85 |
| Hardness König (s) | 110" | 94" | 81" |

Ranking: 0: poor, 5: excellent
Blocking: 0: poor, 10: good

Example 19: Partial Replacement of Fossil Based Monomers by Partially Bio-Based Isobornyl Methacrylate and Partially Bio-Based Iso-Butyl Acrylate In a first step an oligomer was synthesized using the procedure of Example 13. The amount of ADEKA REA-SOAP® SR-1025 in the reactor pre-charge was 6.81 g and in the pre-emulsion for OL1 19.01 g. The monomer composition used is given in the table below.

| Ingredient | Weight (g) Ex. 19 |
|---|---|
| Diacetone acrylamide | 44.83 |
| Methyl methacrylate | 132.75 |
| Isobornyl methacrylate (partially bio-based) | 134.35 |
| Methacrylic acid | 33.54 |
| Iso-butyl acrylate | 38.38 |
| n-Octyl mercaptan | 4.24 |
| 2-Mercapto ethanol | 2.17 |

The number and weight average molecular weights of the oligomer OL1 was:

| Oligomer OL1 | Mn | Mw | disp. (Mw/Mn) |
|---|---|---|---|
| Example 19 | 5,601 | 12,777 | 2.28 |

Using this oligomer, a vinyl polymer P and an oligomer OL2 were polymerized using the procedure of Example 2 and the monomers given in the table below.

| | Monomer | Weight (g) Ex. 19 |
|---|---|---|
| Vinyl polymer P | Divinylbenzene | 2.91 |
| | Styrene | 6.10 |
| | Methyl methacrylate | 0.74 |
| | Isobornyl methacrylate (partially bio-based) | 29.24 |
| | Iso-butyl acrylate | 155.96 |
| Vinyl oligomer OL2 | Divinylbenzene | 2.91 |
| | Styrene | 6.10 |
| | Methyl methacrylate | 0.74 |
| | Isobornyl methacrylate (partially bio-based) | 29.24 |
| | Iso-butyl acrylate | 155.96 |
| | n-Octyl mercaptan | 2.13 |
| | 2-Mercapto ethanol | 1.09 |

The properties for Example 19 are given below:

| Property | Ex. 19 |
|---|---|
| Solids content (%) | 40.0 |
| pH | 8.2 |
| Particle size (nm) | 211 |
| Viscosity (mPa · s) | 1404.0 |
| MFFT (° C.) | 20 |
| Bio-based Carbon (%) | 42.0 |

The molecular weights after the different stages in the synthesis process are given in the following table.

| | After polymerization of OL1 + P | | After polymerization of OL1 + P + OL2* | |
|---|---|---|---|---|
| Stage | Mn | Mw | Mn | Mw |
| Ex. 19 | 6,706 | 119,146 | 7,672 | 208,114 |

*prior to the addition of adipic dihydrazide

Clear varnishes were made with the polymer dispersions of Example 5C and 19 using the formulation given before. The table below gives some of the properties of these varnishes:

| Polymer dispersion from | Ex. 5 C | Ex. 19 |
|---|---|---|
| Appearance on LENETA ® | 4-5 | 4 |
| Early blocking | 8 | 8 |
| Early water resistance | | |
| 1 hour | 5 | 5 |
| 2 hours | 4-5 | 5 |
| 3 hours | 4-5 | 5 |
| 4 hours | 4 | 5 |
| Gloss 20°-60° | 68-84 | 60-79 |
| Hardness König (s) | 105 | 108 |

Ranking: 0: poor, 5: excellent
Blocking: 0: poor, 10: good

Example 20: Oligomer OL1 with Methylmethacrylate, Dimethylitaconate, Isobutylacrylate, Isobornylmethacrylate, Methacrylic Acid and Diacetone Acrylamide In a double-walled reactor with a mechanical stirrer, nitrogen supply, cooler and inlet for monomer and initiator feed lines, 3058.39 grams of demineralized water and 35.07 grams of ADEKA REASOAP® SR-1025 is weighed in and heated to 70° C. under a nitrogen blanket. A monomer pre-emulsion is made by dissolving 97.93 grams of ADEKA REASOAP® SR-1025 and 230.92 grams of diacetone acrylamide in 794.96 grams of demineralized water. To this solution are added under stirring:

| Ingredient | Weight (g) |
|---|---|
| Methyl methacrylate | 338.99 |
| Dimethyl itaconate | 338.99 |
| Isobornyl methacrylate | 728.6 |
| Methacrylic acid | 172.76 |
| Iso-butyl acrylate | 167.1 |
| n-octyl mercaptan | 21.85 |
| 2-mercapto ethanol | 11.2 |

When the contents of the reactor have reached 70° C., 5% of the pre-emulsion is added over a period of 5 minutes. The heating is continued to 80° C. When the contents of the reactor have reached 80° C., a solution of 1.72 grams of ammonium persulphate in 76.97 grams of demineralized water is added to the reactor. An exothermal reaction occurs. When the exotherm has subsided, heating is continued until a temperature of 85° C. is reached. The remainder of the pre-emulsion is fed into the reactor over a period of 60 minutes. Simultaneously a solution of 4.49 grams of ammonium persulphate in 283.52 grams of demineralized water is dosed into the reactor over a period of 70 minutes. The container for the pre-emulsion and feed lines are rinsed with 260.43 grams of demineralized water and the container of the persulphate solution and feed lines with 16.49 grams of demineralized water. The contents of the reactor are kept at 85° C. for 30 minutes. A solution of 52.78 grams of ammonia (25% aqueous) in 111.61 grams demineralized water is dosed into the reactor over a period of 30 minutes. The container is rinsed with 38.49 grams of demineralized water that is added to the reactor. The batch is cooled to room temperature and is stored in suitable containers and is used for the following experiments. Properties of this oligomer OL1 solution were:

| Property | Ex. 20 |
|---|---|
| Solids content (%) | 30.4 |
| pH | 8.1 |
| Particle size (nm) | 198 |
| Mn | 4,842 |
| Mw | 13,131 |

Example 21 and 22: Polymer without Divinyl Benzene and with Additional Diacetone Acrylamide 865.37 grams of the oligomer from example 20 was weight into a double-walled reactor with a mechanical stirrer, nitrogen supply, cooler and inlet for monomer and initiator feed lines. The contents of the reactor were heated to 45° C. under a nitrogen blanket. A monomer mixture was made-up by mixing the monomers from the table below:

| Monomer | Ex. 21 | Ex. 22 |
|---|---|---|
| Diacetone acrylamide | — | 4.37 |
| Divinyl benzene | — | — |
| Methyl methacrylate | 0.48 | 0.48 |
| Dimethyl itaconate | 0.48 | 0.48 |
| Isobornyl methacrylate (partially bio-based) | 37.81 | 37.81 |
| Styrene | 7.89 | 7.89 |
| iso-Butyl acrylate | 201.66 | 201.66 |

50% of this monomer mixture was added to the reactor over a period of 5 minutes. The mixture was stirred for 40 minutes. An initiator mixture consisting of 0.09 g of tert. Butyl hydroperoxide in 4.76 g of demineralized water was made and was added to the reactor. A catalyst mixture was made consisting of 0.01 g of iron sulphate heptahydrate, 0.01 g of ethylenediaminetetraacetic acid, di sodium salt and 25.38 g of demineralized water. From this mixture, 33% is added to the reactor. A reducer mixture was made by dissolving 0.38 g of D-Isoascorbic acid, 0.58 g of ammonia (25% aq.) in 54.24 g of demineralized water. 15% of the reducer solution was added to the reactor. The exothermal reaction raised the temperature of the batch to 55° C. The batch is kept at 55° C. for 30 minutes. Afterwards it is cooled to 50° C.

To the remainder of the monomer mixture, 1.36 g of n-octyl mercaptane and 0.7 g of 2-mercapto ethanol were added and mixed. This mixture was added to the reactor over a period of 5 minutes. The monomer container was rinsed with 28.65 g of demineralized water and the water was added to the batch. The batch was kept at temperature for 40 minutes. A second initiator mixture consisting of 0.46 g of tert. Butyl hydroperoxide in 4.76 g of demineralized water was added to the reactor, followed by 33% of the catalyst mixture and 15% of the reducer mixture. The exothermal reaction raises the temperature of the batch to 60° C. The remainder of the reducer solution is dosed to the reactor over a period of 30 minutes. The batch is kept at 60° C. for 30 minutes. To improve the monomer conversion the remainder of the catalyst solution was added.

A third initiator solution consisting of 0.46 g tert. Butyl hydroperoxide in 4.76 g demineralized water was added to the reactor. A second reducer solution consisting of 0.26 g D-isoascorbic acid, 0.41 g of ammonia (25% aq.) in 37.97 g of demineralized water was dosed to the reactor over a period of 30 minutes. The container for the reducer mixtures was rinsed with 2.64 g of demineralized water. To the reactor solid adipic acid dihydrazide was added: 12.69 g for example 21 and 14.63 g for example 22. The addition funnel was rinsed with 18.5 g of demineralized water. Mixing is continued for another 30 minutes in order to ensure that the adipic acid dihydrazide was completely dissolved. After this the batch was cooled to room temperature. During the cooling a solution of 1,2-benzisothiazol-3(2H)-one (10% aq.) in 13.48 g of demineralized water was dosed to the reactor over a period of 15 minutes.

The properties of the polymer dispersions obtained (comprising OL1, OL2 and P) are given in the table below:

| Property | Ex. 21 | Ex. 22 |
|---|---|---|
| Solids content (%) | 38.4 | 39.0 |
| pH | 8.1 | 8.0 |
| Particle size (nm) | 148 | 182 |
| Viscosity (mPa · s) | 150.1 | 223.0 |
| MFFT (° C.) | 7 | 6 |
| Bio-based Carbon (%) | 49.3 | 49.3 |
| Mn | 6,644 | 6,394 |
| Mw | 39,268 | 41,446 |

The polymer dispersions from examples 21 and 22 were formulated into both a clear varnish and a white pigmented coating using the formulation given before.

Results for a clear varnish:

| Clear varnish based on | Ex. 21 | | Ex. 22 | |
|---|---|---|---|---|
| Early blocking 150 μm | 4 | | 7 | |
| Hardness | 125" | | 122" | |
| Chemical resistance 6 hours | | | | |
| | Immediately | After recovery | Immediately | After recovery |
| Water | 5 | 5 | 5 | 5 |
| Alcohol (48% aq.) | 2 | 2 | 1 | 2 |
| Ajax | 4 | 4 | 5 | 5 |
| Coffee | 4-5 | 4-5 | 5 | 5 |
| Early water resistance | | | | |
| 1 h | 5 | 5 | 5 | 5 |
| 3 h | 4 | 5 | 2 | 5 |

Results for a white pigmented coating:

| Pigmented coating based on | | Ex. 21 | Ex. 22 |
|---|---|---|---|
| Brookfield viscosity (mPa · s) | 6 rpm | 8200 | 6700 |
| | 60 rpm | 5630 | 4440 |
| High shear viscosity (P) | | 2.3 | 1.9 |
| Gloss 20-60° | | 26-68 | 27-69 |
| Open time first layer (22.3° C., 42.5% RH, min) | | 12 | 12 |
| Open time second layer (min) | | 10 | 10 |

The invention claimed is:

1. An aqueous vinyl polymer dispersion PD comprising:
1) an aqueous dispersion or solution of a vinyl oligomer OL1 obtainable by free radical emulsion copolymerization of a monomer mixture comprising:
   a) from 5 to 20 wt % of acid functional ethylenically unsaturated monomers M1 or precursors thereof;
   b) from 5 to 90 wt % of non-ionic ethylenically unsaturated monomers M2 other than M1;
   c) from 0.5 to 10 wt % of ethylenically unsaturated monomers M3 with a functional group for cross-linking after film-formation;
   d) from 0.5 to 10 wt % of at least one chain transfer agent CTA;
   where the sum of the weight percentages of monomers M1, M2, M3 and chain transfer agent CTA equals to 100 wt %;
2) an aqueous dispersion of vinyl oligomer OL2 obtainable by free radical emulsion copolymerization of:
   a) from 0 to 5 wt % of acid functional ethylenically unsaturated monomers M1' or precursors thereof;
   b) from 5 to 99.5 wt % of non-ionic ethylenically unsaturated monomers M2' other than M1';
   c) from 0 to 5 wt % of ethylenically unsaturated monomers M3' with a functional group for cross-linking after film-formation;
   d) from 0 to 5 wt % of adhesion promoting ethylenically unsaturated monomers M4';
   e) from 0 to 3 wt % of a polyethylenically unsaturated monomer M5';
   f) from 0.5 to 10 wt % of at least one chain transfer agent CTA';
   where the sum of the weight percentages of monomers M1', M2', M3', M4', M5' and chain transfer agent CTA' equals to 100 wt %; and
3) a vinyl polymer P under the form of an aqueous dispersion comprising:
   a) from 0 to 5 wt % of acid functional ethylenically unsaturated monomers M1" or precursors thereof;
   b) from 5 to 99.5 wt % of non-ionic ethylenically unsaturated monomers M2" other than M1";
   c) from 0 to 5 wt % of ethylenically unsaturated monomers M3" with a functional group for cross-linking after film-formation;
   d) from 0 to 5 wt % of adhesion promoting ethylenically unsaturated monomers M4";
   e) from 0 to 3 wt % of a polyethylenically unsaturated monomer M5";
   f) from 0 to 1 wt % of at least one chain transfer agent CTA";
   where the sum of the weight percentages of monomers M1", M2", M3", M4", M5" and chain transfer agent CTA" equals to 100 wt %,
   wherein the weight ratio of vinyl oligomers OL1 and OL2 to vinyl polymer P ranges from 10:45:45 to 90:5:5, and
   wherein the aqueous vinyl polymer dispersion PD is made by a process comprising at least the following subsequent steps 1) to 3):
1) making vinyl oligomer OL1 with acid functionality by polymerizing the monomers for vinyl oligomer OL1, after which oligomer OL1 is partially or completely dissolved by the addition of a base, and
2) polymerizing the monomers for vinyl oligomer OL2 in the presence of the neutralized vinyl oligomer OL1 and 3) polymerizing the monomers for vinyl polymer P in the presence of both the neutralized vinyl oligomer OL1 and the vinyl oligomer OL2 previously formed, or 2) polymerizing the monomers for vinyl polymer P in the presence of the neutralized vinyl oligomer OL1 and 3) polymerizing the monomers for vinyl oligomer OL2 in the presence of both the neutralized vinyl oligomer OL1 and the vinyl polymer P previously formed.

2. The aqueous vinyl polymer dispersion PD according to claim 1, wherein the vinyl oligomer OL1 has a number average molecular weight Mn of from 500 g/mole to 25,000 g/mole determined by gel permeation chromatography using tetrahydrofuran and 2 wt % acetic acid as eluent and using polystyrene standards; has a glass transition temperature within the range of 10 to 150° C.; and has an acid number of at least 45 mg KOH/g as determined by ISO 3682.

3. The aqueous vinyl polymer dispersion PD according to claim 1, wherein the number average molecular weight Mn of vinyl oligomer OL2 is between 500 g/mole to 25,000 g/mole determined by gel permeation chromatography using tetrahydrofuran and 2 wt % acetic acid as eluent and using polystyrene standards, and has a glass transition temperature within the range of –50 to 80° C.

4. The aqueous vinyl polymer dispersion PD according to claim 1, wherein the weight average molecular weight Mw of the dispersion PD is between 25,000 g/mole to more than 1,000,000 g/mole determined by gel permeation chromatography using tetrahydrofuran and 2 wt % acetic acid as eluent and using polystyrene standards.

5. The aqueous vinyl polymer dispersion PD according to claim 4, wherein the weight average molecular weight Mw of the dispersion PD is between 35,000 g/mole and 75,000 g/mole, Mw being determined by gel permeation chromatography using tetrahydrofuran and 2 wt % acetic acid as eluent and using polystyrene standards.

6. The aqueous vinyl polymer dispersion PD according to claim 1, wherein vinyl oligomer OL2 and/or vinyl polymer P have an acid functionality being at least 20 mg KOH/g lower than that of vinyl oligomer OL1.

7. The aqueous vinyl polymer dispersion PD according to claim 1, wherein vinyl polymer P has a glass transition temperature within the range of –50 to 80° C.

8. The aqueous vinyl polymer dispersion PD according to claim 1, wherein the monomers M1, M1' and M1" are, each independently, selected from the group consisting of carboxylic acid functional monomers and their precursors.

9. The aqueous vinyl polymer dispersion PD according to claim 1, wherein the monomers M2, M2' and M2" comprise styrene or styrene derivatives, alkyl esters of (meth) acrylic acid, vinyl esters, or vinyl monomers containing hydroxyl groups.

10. The aqueous vinyl polymer dispersion PD according to claim 1, wherein the functional groups of monomers M3, M3' and M3" are carbonyl or acetoacetate groups.

11. The aqueous vinyl polymer dispersion PD according to claim 1, wherein the monomers M1, M1', M1", M2, M2', M2", M3, M3' and/or M3" are derived from bio-renewable sources.

12. The aqueous vinyl polymer dispersion PD according to claim 1, wherein the monomers M4' and M4" comprise nitrogen based functional groups.

13. The aqueous vinyl polymer dispersion PD according to claim 1, wherein the monomers M5' and M5" are cross-linking agents having from two to six ethylenically unsaturated groups per molecule.

14. The aqueous vinyl polymer dispersion PD according to claim 1, wherein the chain transfer agent CTA and/or CTA' is a combination of a hydrophobic and a hydrophilic mercaptan in a weight ratio of 10/90 to 90/10.

15. A process for making an aqueous vinyl polymer dispersion PD of claim 1, the process comprising at least the following subsequent steps 1) to 3):

1) making vinyl oligomer OL1 with acid functionality by polymerizing the monomers for vinyl oligomer OL1, after which oligomer OL1 is partially or completely dissolved by the addition of a base, and 2) polymerizing the monomers for vinyl oligomer OL2 in the presence of the neutralized vinyl oligomer OL1 and 3) polymerizing the monomers for vinyl polymer P in the presence of both the neutralized vinyl oligomer OL1 and the vinyl oligomer OL2 previously formed, or 2) polymerizing the monomers for vinyl polymer P in the presence of the neutralized vinyl oligomer OL1 and 3) polymerizing the monomers for vinyl oligomer OL2 in the presence of both the neutralized vinyl oligomer OL1 and the vinyl polymer P previously formed.

16. The process according to claim 15, wherein the base in step 1) is selected from the group consisting of an alkali hydroxide, ammonia, an organic amine, and mixtures thereof, preferably the base is a volatile base.

17. The process according to claim 15, wherein the vinyl oligomer OL1 is prepared by aqueous free radical emulsion polymerization, preferably in the presence of a co-polymerizable surfactant, more preferably the amount of surfactant solids is 0.1 to 15 wt % based on the weight of oligomer OL1.

18. The process according to claim 15, wherein vinyl oligomer OL2 and vinyl polymer P are prepared by aqueous free radical emulsion polymerization.

19. Use of the aqueous vinyl polymer dispersion PD according to claim 1 to increase the open-time of a coating composition.

20. A coating composition comprising the aqueous vinyl polymer dispersion PD according to claim 1 and at least one or more conventional ingredients selected from the group consisting of non-vinyl polymers, pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, wetting agents and the like, and mixtures thereof.

21. A paint composition comprising the coating composition according to claims 20 and 1 wt % to 70 wt % pigment or filler.

22. A method of making a coating composition comprising the aqueous vinyl polymer dispersion PD according to claim 1 and at least one or more conventional ingredients, the method comprising the steps of blending the aqueous vinyl polymer dispersion PD according to claim 1 with the at least one or more conventional ingredients selected from the group consisting of non-vinyl polymers, pigments, dyes, emulsifiers, surfactants, plasticizers, thickeners, heat stabilizers, levelling agents, anti-cratering agents, fillers, sedimentation inhibitors, UV absorbers, antioxidants, drier salts, organic co-solvents, wetting agents and the like, and mixtures thereof.

23. An article coated with the coating composition according to claim 20.

24. The aqueous vinyl polymer dispersion PD according to claim 8, wherein the monomers M1, M1' and M1" are, each independently, selected from the group consisting of acrylic acid, methacrylic acid, maleic acid anhydride, maleic acid or its half-esters, fumaric acid or its half esters, β-carboxyethyl acrylate, and itaconic acid or its half esters.

25. The aqueous vinyl polymer dispersion PD according to claim 10, wherein the monomers M3, M3' and M3" are, each independently, selected from the group consisting of acetoacetoxyethyl methacrylate, diacetone acrylamide, and mixtures thereof.

26. The aqueous vinyl polymer dispersion PD according to claim 11, wherein the monomers M1, M1', M1", M2, M2', M2", M3, M3' and/or M3" are derived from (partially) bio-renewable iso-butyl acrylate, glycerol formal methacrylate, isopropylidene glycerol methacrylate, isobornyl methacrylate, isobornyl acrylate, and/or alkyl itaconates.

* * * * *